US012207072B2

(12) United States Patent
Shi et al.

(10) Patent No.: US 12,207,072 B2
(45) Date of Patent: Jan. 21, 2025

(54) SPEAKER

(71) Applicant: AAC Microtech (Changzhou) Co., Ltd., Changzhou (CN)

(72) Inventors: Yang Shi, Shenzhen (CN); Jiasheng Zhou, Shenzhen (CN)

(73) Assignee: AAC Microtech (Changzhou) Co., Ltd., Changzhou (CN)

(*) Notice: Subject to any disclaimer, the term of this patent is extended or adjusted under 35 U.S.C. 154(b) by 252 days.

(21) Appl. No.: 18/090,448

(22) Filed: Dec. 28, 2022

(65) Prior Publication Data

US 2024/0080623 A1 Mar. 7, 2024

Related U.S. Application Data

(63) Continuation of application No. PCT/CN2022/125121, filed on Oct. 13, 2022.

(30) Foreign Application Priority Data

Sep. 2, 2022 (CN) ........................ 202222341732.X

(51) Int. Cl.
*H04R 9/02* (2006.01)
*H04R 7/12* (2006.01)
*H04R 9/04* (2006.01)
*H04R 9/06* (2006.01)

(52) U.S. Cl.
CPC ............. *H04R 9/027* (2013.01); *H04R 7/127* (2013.01); *H04R 9/046* (2013.01); *H04R 9/06* (2013.01); *H04R 2499/11* (2013.01)

(58) Field of Classification Search
CPC ........ H04R 9/027; H04R 7/127; H04R 9/046; H04R 9/06; H04R 2499/11; H04R 2400/11; H04R 7/04; H04R 7/20; H04R 2209/024; H04R 9/025
See application file for complete search history.

(56) References Cited

U.S. PATENT DOCUMENTS

2022/0174421 A1* 6/2022 Song ...................... H04R 1/026
2023/0143442 A1* 5/2023 Ren .......................... H04R 9/06
381/353

* cited by examiner

*Primary Examiner* — Tuan D Nguyen
(74) *Attorney, Agent, or Firm* — W&G Law Group

(57) ABSTRACT

A speaker includes: a frame, a vibration system, including a diaphragm and a voice coil driving the diaphragm to vibrate and emit sounds, and a magnetic circuit system fixed to the frame, including a lower plate, and a central magnetic portion and an auxiliary magnet fixed to the lower plate, the central magnetic portion spaced apart from the auxiliary magnet, the auxiliary magnet surrounding the central magnetic portion and forming a magnetic gap, the voice coil located in the magnetic gap, wherein the central magnetic portion includes a main magnetic portion and a reinforcing portion surrounding the main magnetic portion, a projection of the voice coil in a vibration direction of the diaphragm is at least partially located in the reinforcing portion. Compared with the related art, the speaker disclosed by the present disclosure could improve the BL value of the voice coil.

10 Claims, 3 Drawing Sheets

SPEAKER

TECHNICAL FIELD

The present disclosure relates to an electro-acoustic device, in particular to a speaker used in portable electronic products.

BACKGROUND

With the advent of the mobile internet era, electronic products are being updated faster and faster, and people have higher and higher requirements for the performance of electronic products, one of them is the high-quality music function. Therefore, the performance of the electro-acoustic system needs to be continuously improved, and high-quality speakers are one of the prerequisites for realizing this high-quality music function.

A related speaker usually includes a frame, and a vibration system and a magnetic circuit system fixed to the frame. The vibration system includes a diaphragm and a voice coil driving the diaphragm to vibrate and emit sounds. The magnetic circuit system includes a lower plate, a main magnetic portion and an auxiliary magnet which is apart from the main magnetic portion and fixed to the lower plate, the main magnetic portion and the auxiliary magnet form a magnetic gap, the voice coil is located in the magnetic gap. A projection of the voice coil along a vibration direction of the diaphragm is located in the lower plate, the distance between the voice coil and the lower plate is relatively long, which affects the BL value of the voice coil (that is the magnetic force value, the product of magnetic flux density B and the length of the voice coil wire L). The higher of the BL value of the voice coil, the greater of the displacement of the diaphragm at the same voltage, and thus the higher of the sound pressure level and sensitivity.

Therefore, it is a need to provide an improved speaker to solve the above problems.

SUMMARY

In view of the above, an objective of the present disclosure is to provide a speaker with higher BL value of the voice coil.

In order to achieve the objective mentioned above, the present disclosure discloses a speaker including: a frame, a vibration system fixed to the frame, including a diaphragm fixed to the frame and a voice coil driving the diaphragm to vibrate and emit sounds, and a magnetic circuit system fixed to the frame, including a lower plate, and a central magnetic portion and an auxiliary magnet fixed to the lower plate, the central magnetic portion spaced apart from the auxiliary magnet, the auxiliary magnet surrounding the central magnetic portion and forming a magnetic gap, the voice coil located in the magnetic gap, wherein the central magnetic portion includes a main magnetic portion and a reinforcing portion surrounding the main magnetic portion, a projection of the voice coil in a vibration direction of the diaphragm is at least partially located in the reinforcing portion.

As an improvement, the reinforcing portion is in a hollow ring structure and surrounds the main magnetic portion.

As an improvement, the reinforcing portion and the main magnetic portion are magnets, and the reinforcing portion and the main magnetic portion are integrally formed or formed separately.

As an improvement, the reinforcing portion is a magnetic conductive ring, and the main magnetic portion is a magnet.

As an improvement, wherein the main magnetic portion comprises a first main magnetic portion fixed to the lower plate and a second main magnetic portion attached to a side of the first main magnetic portion far away from the lower plate, the first main magnetic portion and the reinforcing portion are integrally formed.

As an improvement, the first main magnetic portion, the second main magnetic portion and the reinforcing portion are magnets.

As an improvement, the first main magnetic portion and the second main magnetic portion are integrally formed or formed separately.

As an improvement, the first main magnetic portion and the reinforcing portion are magnetic conductive plates, the second main magnetic portion is magnet.

As an improvement, the first main magnetic portion and the lower plate are integrally formed or formed separately.

As an improvement, the diaphragm comprises a dome and a suspension connected with the dome and the frame, the dome is located at a side of the suspension close to the magnetic circuit system, the voice coil is fixedly connected with the dome.

As an improvement, an amount of the flexible circuit boards is four, the four flexible circuit boards are respectively arranged at four corners of the frame, the first pad and the second pad are arranged on different flexible circuit boards.

As an improvement, the magnetic circuit system includes a yoke, and a main magnetic portion and a plurality of auxiliary magnets located on the yoke, the plurality of auxiliary magnets is located around the main magnetic portion and forms the magnetic gap with the main magnetic portion, a plurality of receiving spaces for receiving the flexible circuit boards is formed between adjacent auxiliary magnets.

As an improvement, the magnetic circuit system further includes a main pole plate located on the main magnetic portion and a auxiliary pole plate located on the plurality of auxiliary magnets, the auxiliary pole plate is provided with a plurality of avoiding spaces respectively corresponding to the plurality of receiving spaces, and a projection of each flexible circuit board along the vibration direction of the diaphragm is at least partially located in a corresponding one of the avoiding spaces.

As an improvement, the auxiliary pole plate is a hollow annular structure, and the avoiding spaces are arranged at corners of the auxiliary pole plate.

As an improvement, in the flexible circuit board includes a first fixing arm fixed to the frame, a second fixing arm spaced from the first fixing arm, and an elastic connecting arm connecting the first fixing arm and the second fixing arm, the first pad and the second pad are arranged on the second fixing arm.

As an improvement, the frame includes a plurality of receiving grooves for accommodating the first fixing arms, and each first fixing arm is fixed in a corresponding one of the receiving grooves.

DESCRIPTION OF EMBODIMENTS

The technical solutions in embodiments of the present disclosure will be described clearly and completely below with reference to the accompanying drawings in the embodiments of the present disclosure.

First Embodiment

Figure 1:
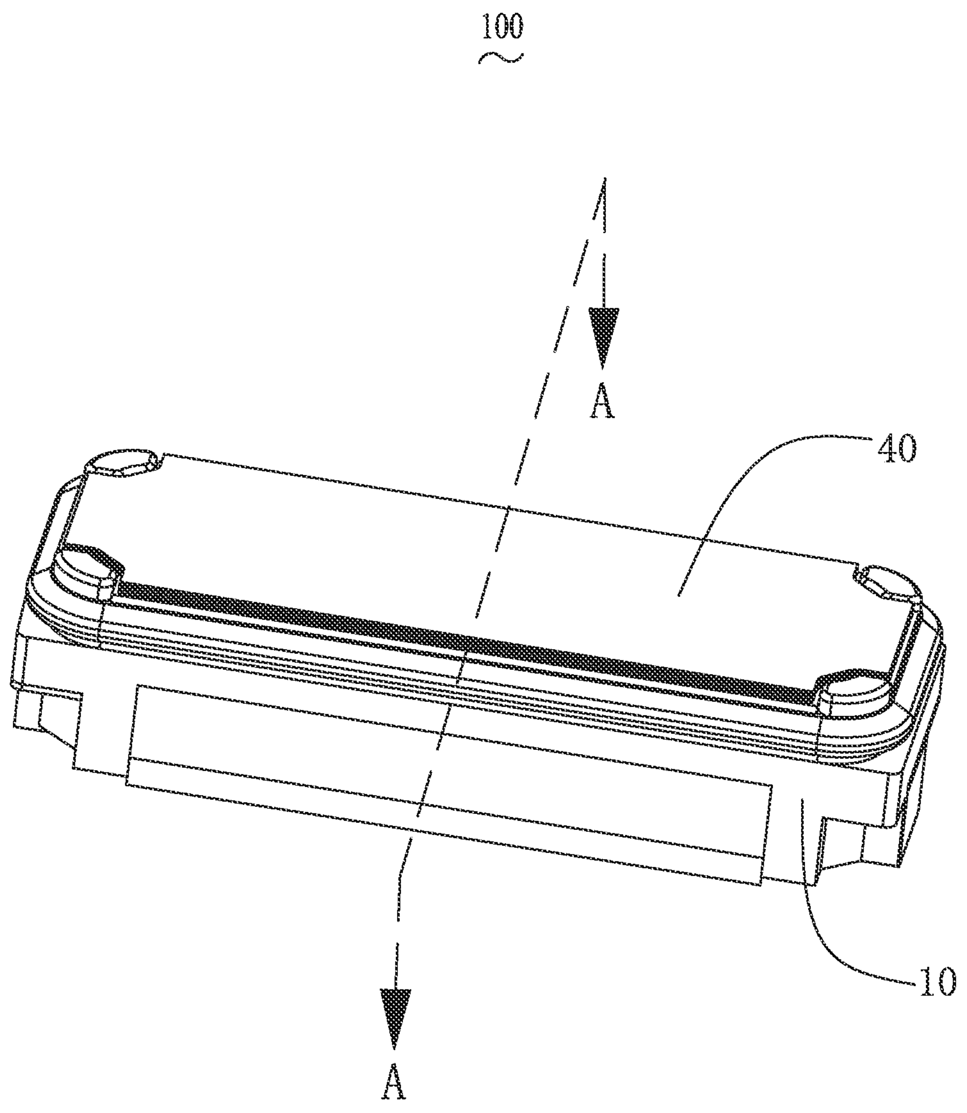
FIG. 1 is an isometric view of a speaker in accordance with a first embodiment of the present disclosure.
Figure 2:
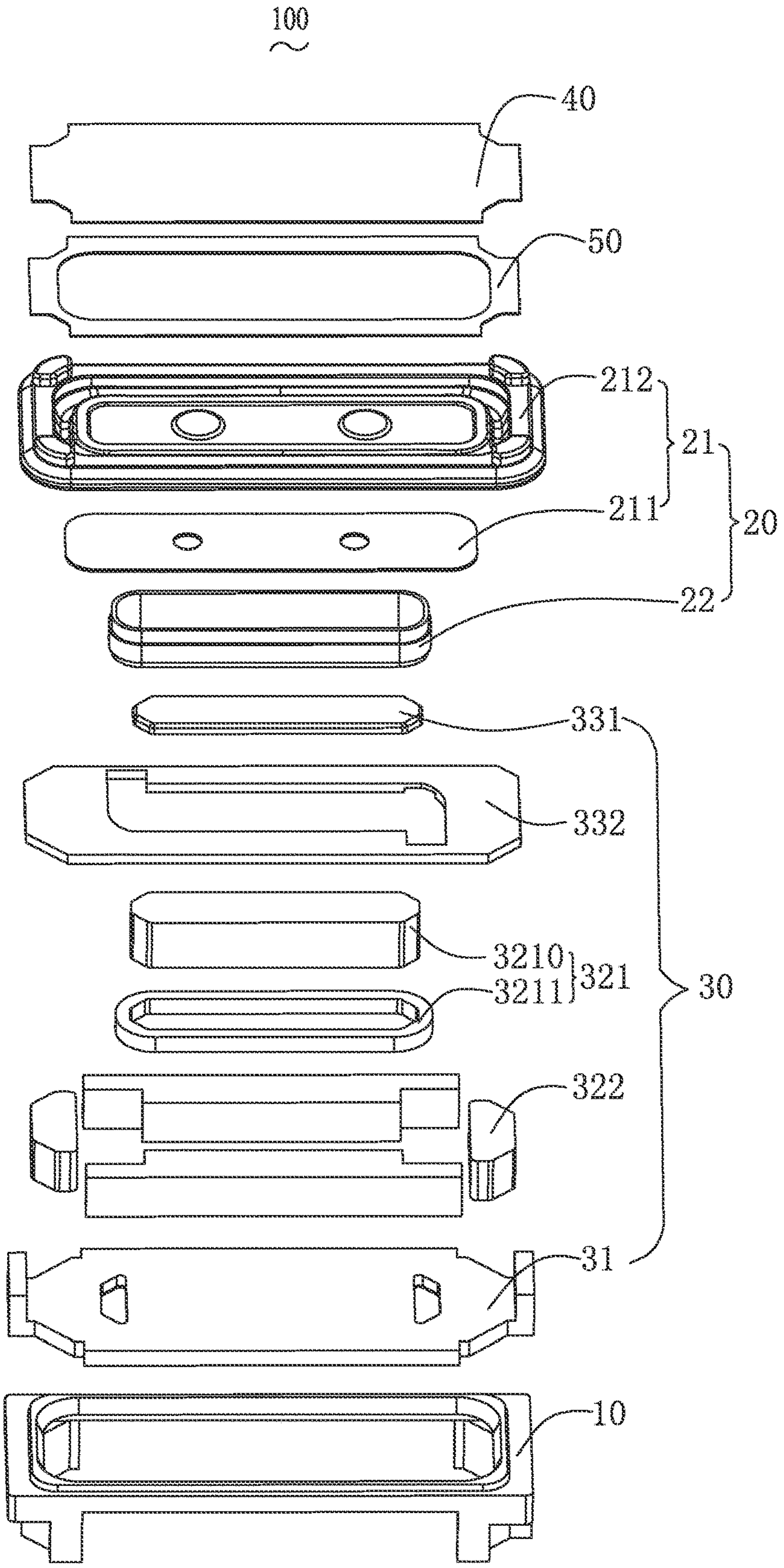
FIG. 2 is an exploded view of the speaker in FIG. 1.
Figure 3:
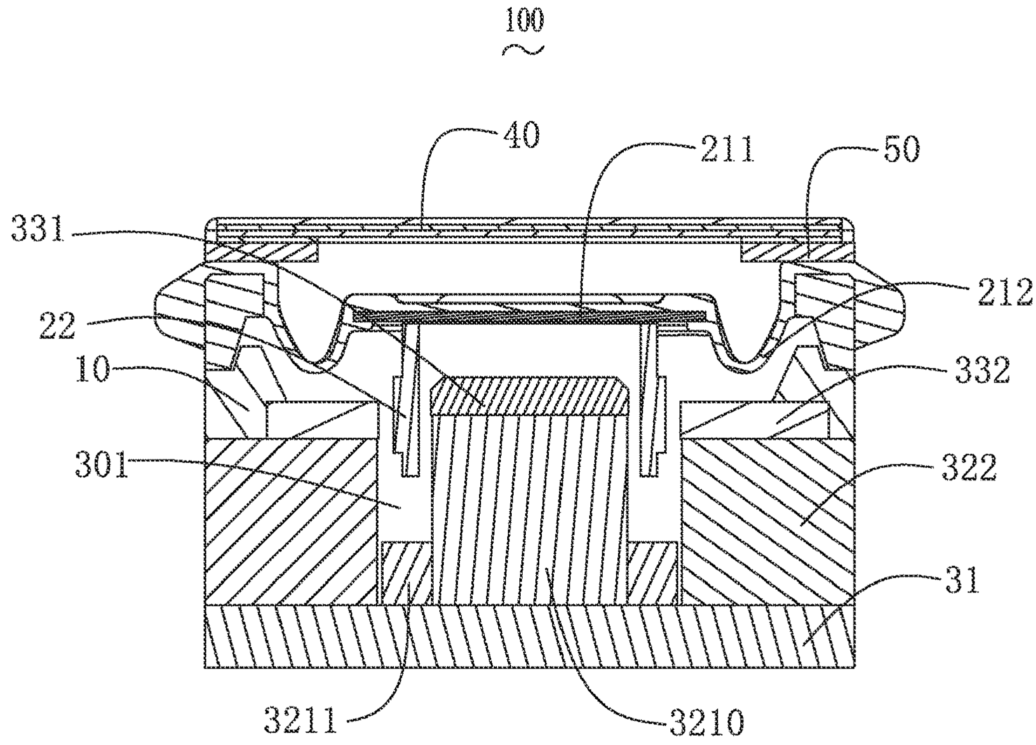
FIG. 3 is a cross-sectional view of the speaker taken along line A-A in FIG. 1.

As shown in FIGS. 1-3, the present disclosure discloses a speaker 100. The speaker 100 includes a frame 10, and a vibration system 20 and a magnetic circuit system 30 fixed to the frame 10.

The vibration system 20 includes a diaphragm 21 and a voice coil 22 driving the diaphragm 21 to vibrate and emit sound. The diaphragm 21 includes a dome 211, and a suspension 212 connected with the dome 211 and the frame 10, the dome 10 is located at a side of the suspension 212 close to the magnetic circuit system 30, the voice coil 22 is fixedly connected with the dome 211.

The magnetic circuit system 30 includes a lower plate 31, a central magnetic portion 321, and an auxiliary magnet 322 apart from the central magnetic portion 321 and fixed to the lower plate 31, a main pole plate 331 attached to the central magnetic portion 321, and an auxiliary pole plate 332 attached to the auxiliary magnet 322, the auxiliary magnet 322 surrounds the main magnetic portion 321 for forming a magnetic gap 301, the voice coil 22 is located in the magnetic gap 301. The central magnetic portion 321 includes a main magnetic portion 3210 and a reinforcing portion 3211 surrounding the main magnetic portion 3210, a projection of the voice coil 22 in a vibration direction of the diaphragm 21 is at least partially located in the reinforcing portion 3211. Due to the magnetic component added under the voice coil 22, the BL value of the voice coil 22 is improved.

The main magnetic portion 3210 is fixedly connected with the lower plate 31, the reinforcing portion 3211 is in a hollow ring structure and surrounds the main magnetic portion 3210. The height of the main magnetic portion 3210 is higher than the height of the reinforcing portion 3211, that is, the main magnetic portion 3210 is closer to the diaphragm 21 than the reinforcing portion 3211, the voice coil 22 is located at a side of the main magnetic portion 3210. The reinforcing portion 3211 and the main magnetic portion 3210 are all magnets, and the reinforcing portion 3211 and the main magnetic portion 3210 are integrally formed or formed separately. In the other embodiment, the main magnetic portion could be a magnet, the reinforcing portion could be a magnetic conductive ring, the main magnetic portion and the reinforcing portion could be formed separately.

In addition, the speaker 100 is also provided with an upper cover 50 fixed to the diaphragm 21 and a breathable isolation member 40 that covers the upper cover 50.

Second Embodiment

Figure 4:
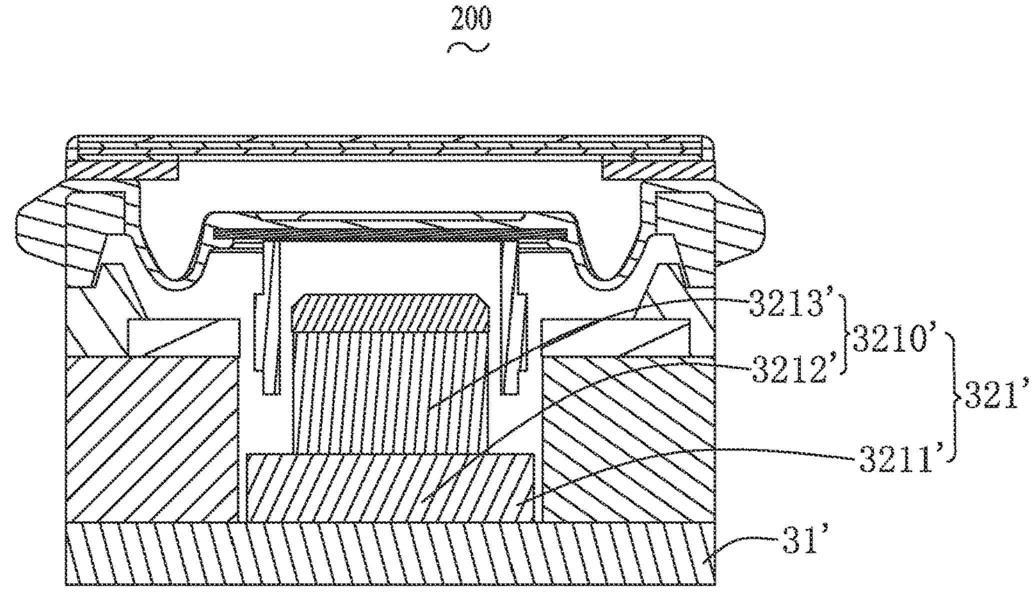
FIG. 4 is a cross-sectional view of the speaker in accordance with a second embodiment of the present disclosure.

Referring to FIG. 4, a speaker 200 is provided by the second embodiment. The distinction between the second embodiment and the first embodiment is that, the structure of the central magnetic portion 321' is different. In the second embodiment, the main magnetic portion 3210' includes a first main magnetic portion 3212' fixed to the lower plate 31' and a second main magnetic portion 3213' attached to a side of the first main magnetic portion 3212' far away from the lower plate 31', the first main magnetic portion 3212' and the reinforcing component 3211' are integrally formed. The first main magnetic portion 3212', the second main magnetic portion 3213' and the reinforcing portion 3211' are all magnets. The first main magnetic portion 3212' and the second main magnetic portion 3213' are integrally formed or formed separately. In the other embodiment, the first main magnetic portion and the reinforcing portion could be magnetic conductive rings, the second main magnetic portion is magnet, the first main magnetic portion and the lower plate could be integrally formed or formed separately Compared with the related art, the above-mentioned speaker effectively improves the BL value of the voice coil by providing a magnet component under the voice coil.

The above descriptions are merely some of the embodiments of the present disclosure. It should be pointed out that for those of ordinary skill in the art, improvements can be made without departing from the inventive concept of the present disclosure, shall fall within the scope of the present disclosure.

What is claimed is:

1. A speaker, comprising:

a frame, a vibration system fixed to the frame, comprising a diaphragm fixed to the frame and a voice coil driving the diaphragm to vibrate and emit sounds, and a magnetic circuit system fixed to the frame, comprising a lower plate, and a central magnetic portion and an auxiliary magnet fixed to the lower plate, the central magnetic portion spaced apart from the auxiliary magnet, the auxiliary magnet surrounding the central magnetic portion and forming a magnetic gap, the voice coil located in the magnetic gap, wherein the central magnetic portion comprises a main magnetic portion and a reinforcing portion surrounding the main magnetic portion, a projection of the voice coil in a vibration direction of the diaphragm is at least partially located in the reinforcing portion.

2. The speaker described as claim 1, wherein the reinforcing portion is in a hollow ring structure and surrounds the main magnetic portion.

3. The speaker described as claim 2, wherein the reinforcing portion and the main magnetic portion are magnets, and the reinforcing portion and the main magnetic portion are integrally formed or formed separately.

4. The speaker described as claim 2, wherein the reinforcing portion is a magnetic conductive ring, and the main magnetic portion is a magnet.

5. The speaker described as claim 1, wherein the main magnetic portion comprises a first main magnetic portion fixed to the lower plate and a second main magnetic portion attached to a side of the first main magnetic portion far away from the lower plate, the first main magnetic portion and the reinforcing portion are integrally formed.

6. The speaker described as claim 5, wherein the first main magnetic portion, the second main magnetic portion and the reinforcing portion are magnets.

7. The speaker described as claim 6, wherein the first main magnetic portion and the second main magnetic portion are integrally formed or formed separately.

8. The speaker described as claim 5, wherein the first main magnetic portion and the reinforcing portion are magnetic conductive plates, the second main magnetic portion is magnet.

9. The speaker described as claim 8, wherein the first main magnetic portion and the lower plate are integrally formed or formed separately.

10. The speaker described as claim 1, wherein the diaphragm comprises a dome and a suspension connected with the dome and the frame, the dome is located at a side of the suspension close to the magnetic circuit system, the voice coil is fixedly connected with the dome.

* * * * *